US006679185B2

(12) United States Patent
Sullivan et al.

(10) Patent No.: US 6,679,185 B2
(45) Date of Patent: Jan. 20, 2004

(54) ADJUSTABLE SHOCK ABSORBING TOW BAR

(75) Inventors: Michael Dennis Sullivan, Lee's Summit, MO (US); Jaret Devin Land, Lawrence, KS (US)

(73) Assignee: Automatic Systems, Inc., Kansas City, MO (US)

( * ) Notice: Subject to any disclaimer, the term of this patent is extended or adjusted under 35 U.S.C. 154(b) by 0 days.

(21) Appl. No.: 10/083,834

(22) Filed: Feb. 27, 2002

(65) Prior Publication Data

US 2003/0159614 A1 Aug. 28, 2003

(51) Int. Cl.[7] ............................................. B65G 17/00
(52) U.S. Cl. ............................. 104/172.3; 104/172.1; 213/62 R; 188/129
(58) Field of Search .................... 104/172.3, 172.4, 104/172.2, 172.1; 213/1 R, 7, 62 R, 66, 69; 293/136; 267/196, 201; 188/129, 67, 268, 322.12, 381, 322.18

(56) References Cited

U.S. PATENT DOCUMENTS

| | | | |
|---|---|---|---|
| 1,019,504 A | | 3/1912 | McCombs |
| 1,713,515 A | | 5/1929 | Bechereau |
| 2,373,508 A | | 4/1945 | Snyder |
| 2,471,857 A | | 5/1949 | Bleakney et al. |
| 2,701,629 A | * | 2/1955 | Cairnes et al. ............. 188/129 |
| 2,703,156 A | * | 3/1955 | Depallens .................. 188/129 |
| 2,747,696 A | | 5/1956 | Blattner |
| 2,856,179 A | | 10/1958 | Hogan |
| 2,940,552 A | | 6/1960 | Freyler |
| 2,952,030 A | * | 9/1960 | Guilbert et al. ............. 16/82 |
| 3,059,727 A | | 10/1962 | Fuchs |
| 3,059,916 A | | 10/1962 | Fahlbusch et al. |
| 3,332,523 A | | 7/1967 | Chambers |
| 3,382,955 A | | 5/1968 | Deyerling |
| 3,690,423 A | | 9/1972 | Trongeau |
| 3,709,522 A | | 1/1973 | Olson |
| 3,720,172 A | | 3/1973 | Dehne |
| 3,804,447 A | | 4/1974 | Slavin |
| 3,931,961 A | | 1/1976 | Fader et al. |
| 3,948,186 A | * | 4/1976 | McCaul .................... 104/172.4 |
| 3,951,238 A | | 4/1976 | Dent et al. |
| 3,990,542 A | | 11/1976 | Dent et al. |

(List continued on next page.)

OTHER PUBLICATIONS

"Tyres, Suspension and Handling", John C. Dixon, 1991, pp. 174–181.

(List continued on next page.)

Primary Examiner—S. Joseph Morano
Assistant Examiner—Frantz F. Jules
(74) Attorney, Agent, or Firm—Chase Law Firm, L.C.

(57) ABSTRACT

The trailing, load supporting component of a product conveyor is connected to a powered, leading component by a shock absorbing tow bar that employs relatively movable friction elements in a sandwich configuration to absorb the shock by sliding engagement at internal wear surfaces. A brake tongue slides between opposed brake pads of the sandwich which are placed under pressure against the tongue. A two-piece, telescoping tubular housing shields the brake assembly from contaminants and enhances the structural integrity of the unit.

14 Claims, 13 Drawing Sheets

U.S. PATENT DOCUMENTS

| | | | |
|---|---|---|---|
| RE29,221 | E | 5/1977 | Yang |
| 4,054,186 | A | 10/1977 | Banks, Jr. et al. |
| 4,140,304 | A | 2/1979 | Ghrist |
| 4,187,933 | A | 2/1980 | Calabrese et al. |
| 4,278,266 | A | 7/1981 | Inoue et al. |
| 4,318,535 | A | 3/1982 | Imai |
| 4,540,630 | A | 9/1985 | Wegner et al. |
| 4,660,685 | A | 4/1987 | Thacker et al. |
| 4,846,317 | A | 7/1989 | Hudgens |
| 4,901,829 | A * | 2/1990 | East, Jr. et al. ............. 188/381 |
| 4,944,606 | A | 7/1990 | Lindsey et al. |
| 5,027,715 | A | 7/1991 | Moore et al. |
| 5,067,414 | A | 11/1991 | Moore, deceased et al. |
| 5,069,570 | A | 12/1991 | Pryor et al. |
| 5,133,435 | A | 7/1992 | Taylor |
| 5,152,547 | A | 10/1992 | Davis |
| 5,183,137 | A | 2/1993 | Siwek et al. |
| 5,407,052 | A | 4/1995 | Heideman et al. |
| 5,433,774 | A | 7/1995 | Kapl et al. |
| 5,458,221 | A | 10/1995 | Flux et al. |
| 5,509,513 | A | 4/1996 | Kiesel |
| 5,511,486 | A | 4/1996 | Pollard et al. |
| 5,549,182 | A | 8/1996 | Ehrnsberger et al. |
| 5,595,268 | A * | 1/1997 | Paton ........................ 188/271 |
| 5,725,226 | A | 3/1998 | Cabrerizo-Pariente |
| 5,842,546 | A | 12/1998 | Biswas |
| 5,961,105 | A | 10/1999 | Ehrnsberger et al. |
| 6,176,783 | B1 | 1/2001 | Lindsay et al. |
| 6,193,025 | B1 | 2/2001 | Nakagawa |
| 6,264,014 | B1 | 7/2001 | Ferlicca |
| 6,279,765 | B1 | 8/2001 | Monaco |
| 6,328,291 | B1 | 12/2001 | Marzocchi et al. |
| 6,330,953 | B2 * | 12/2001 | Summa et al. ............ 213/62 R |
| 6,367,601 | B1 | 4/2002 | Ferlicca |

OTHER PUBLICATIONS

"Handbook of Vehicle Design Analysis", John Fenton, 1996, pp. 654–655 & Fig. 79, pp. 664–665 & Fig. 107.
"Car Suspension and Handling", Donald Bastow, 1980, pp. 220–21, 240–49.
"Suspension Principles", pp. 774–83, 818, 819, 838–39, author unknown.
"Auto Mechanics Fundamentals", Martin Wall Stockel, 1974, pp. 288–90.
"Component Support Snubbers–Design, Application and Testing", L.K. Severud and G.D. Summers, 1980, pp. 3–5.
"Shock–Absorber Characteristics", Newton F. Hadley, 1928, pp. 356–63.
"Snubber Design Applications and Minimization Methods", G.T. Jirak and C.L. Braff, 1981, pp. 23–37.

* cited by examiner

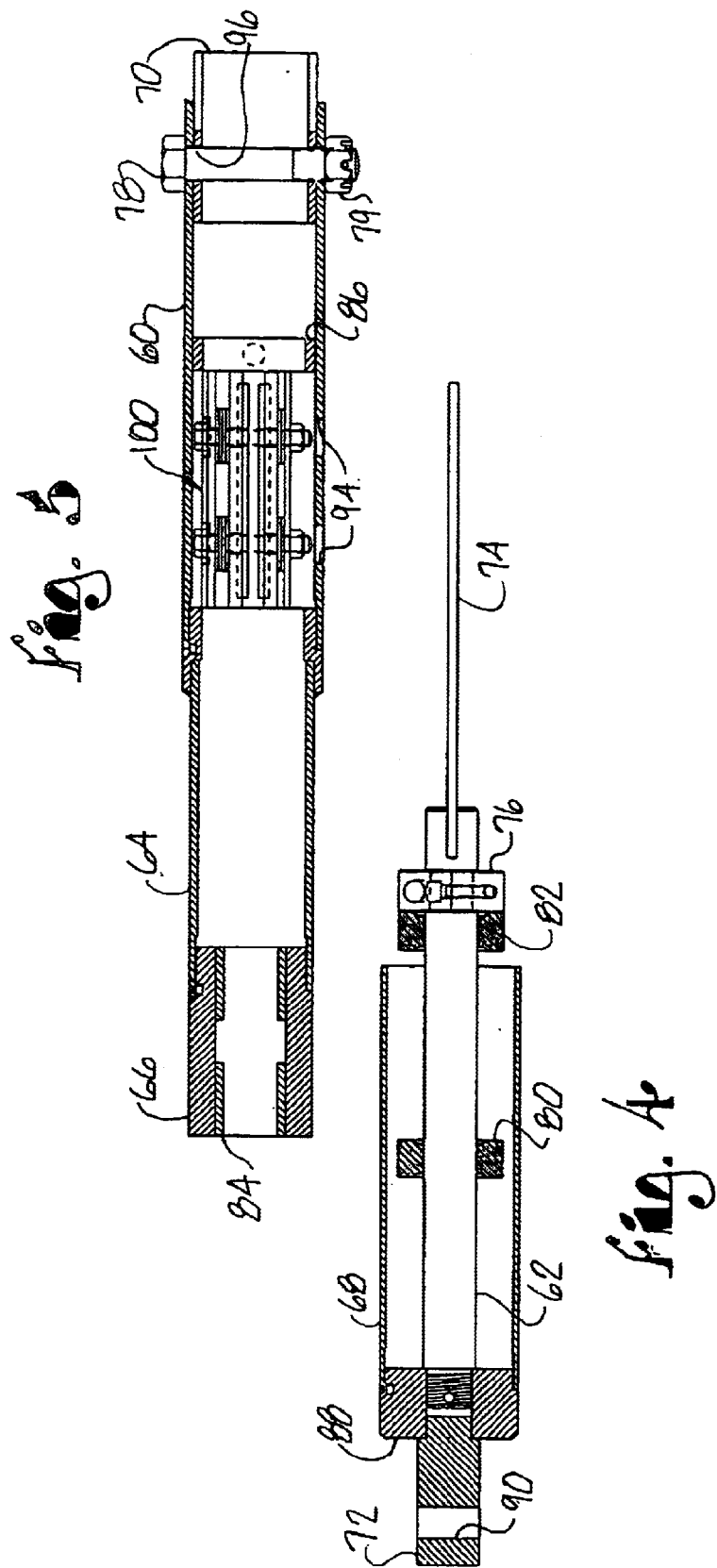

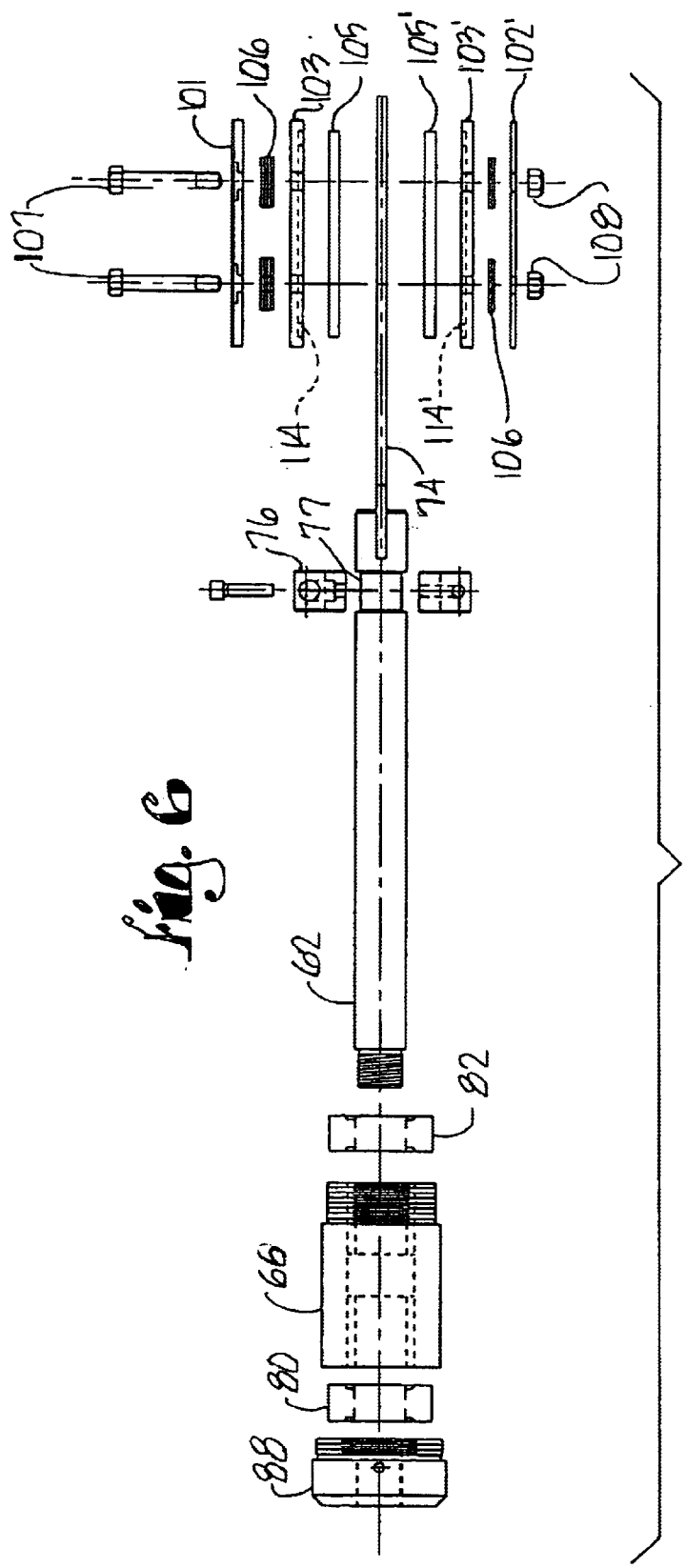

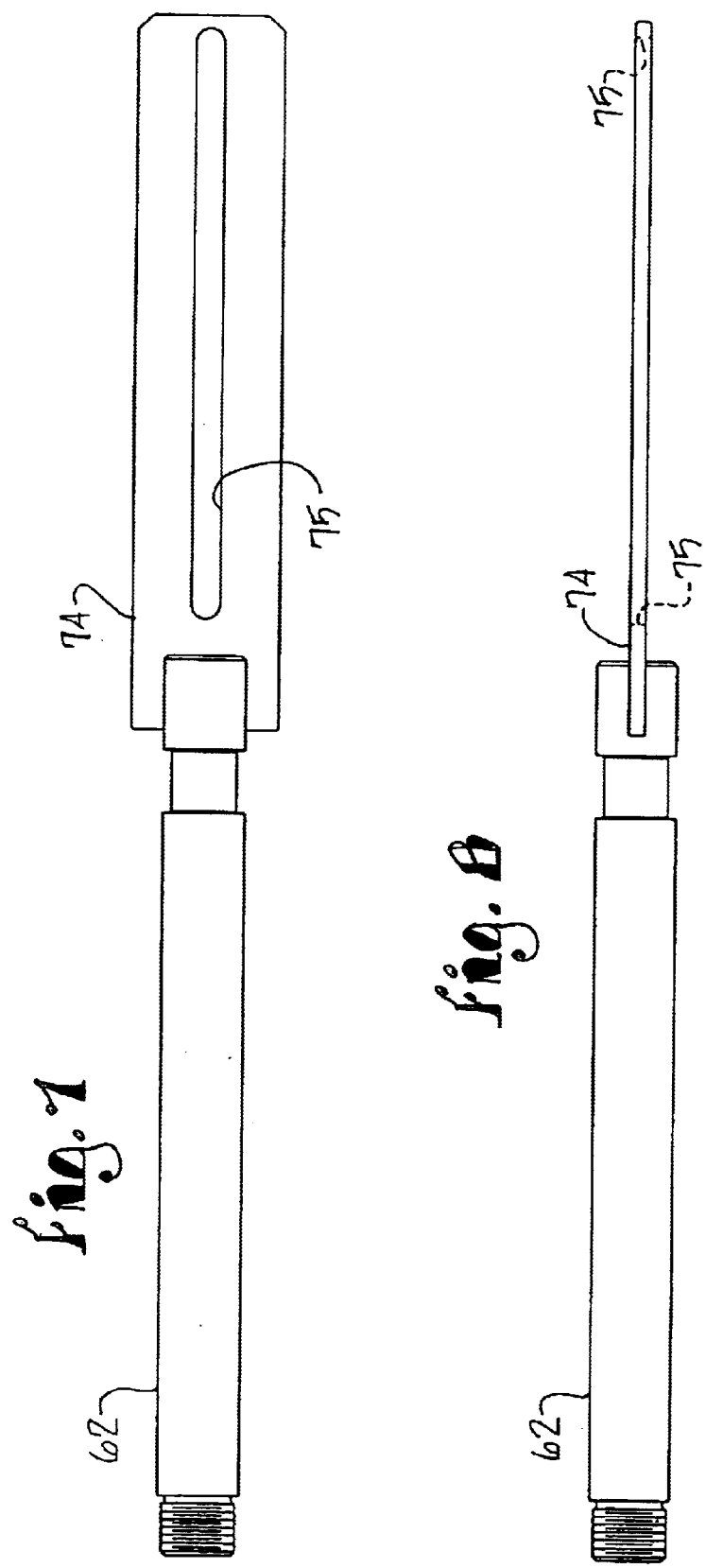

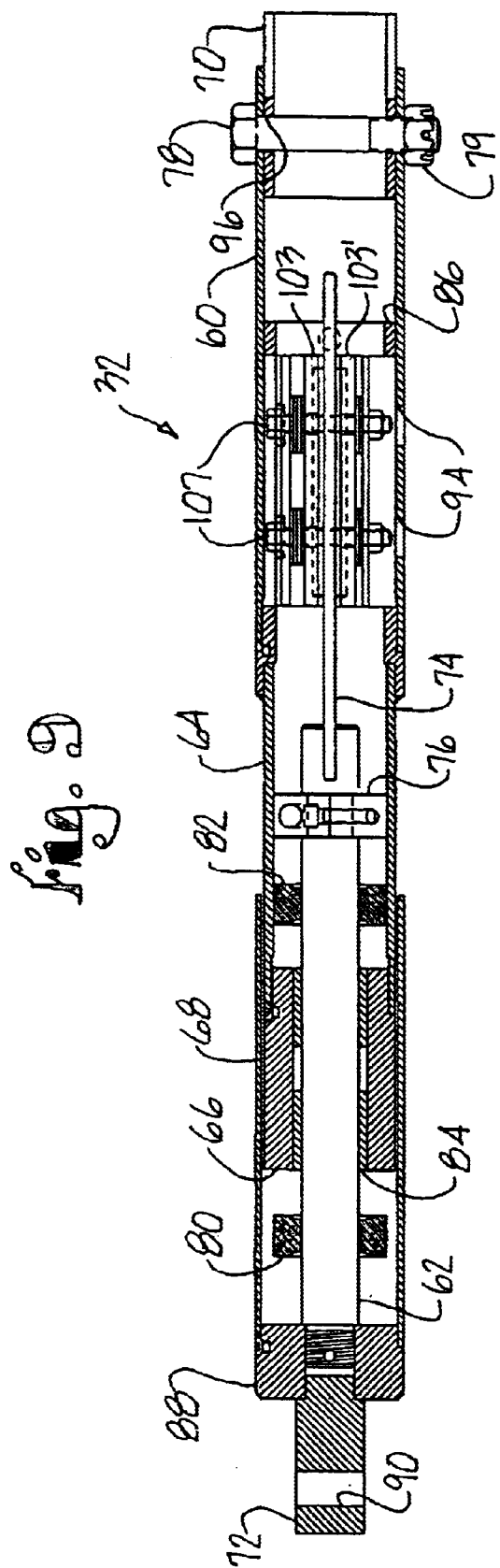

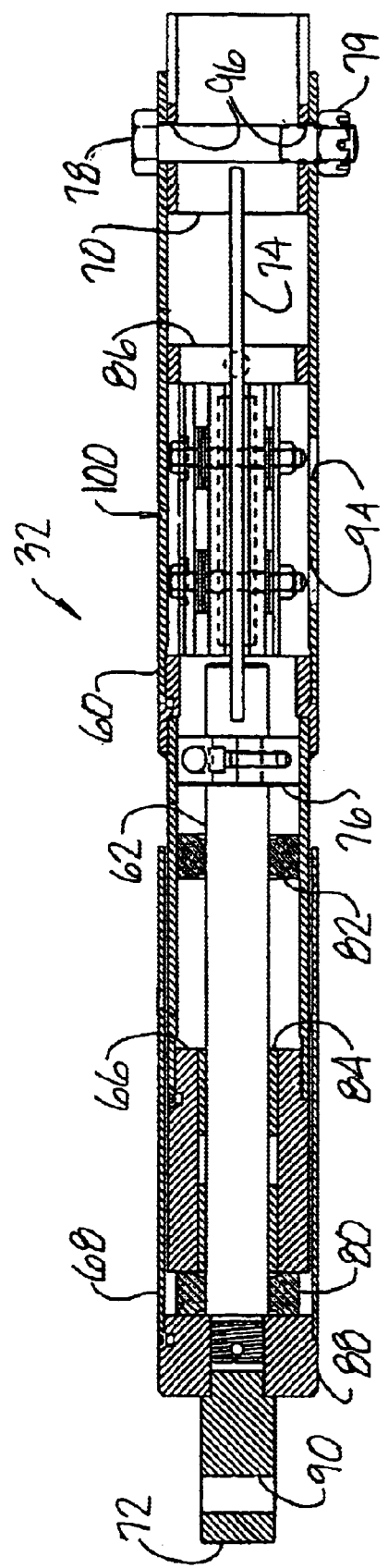

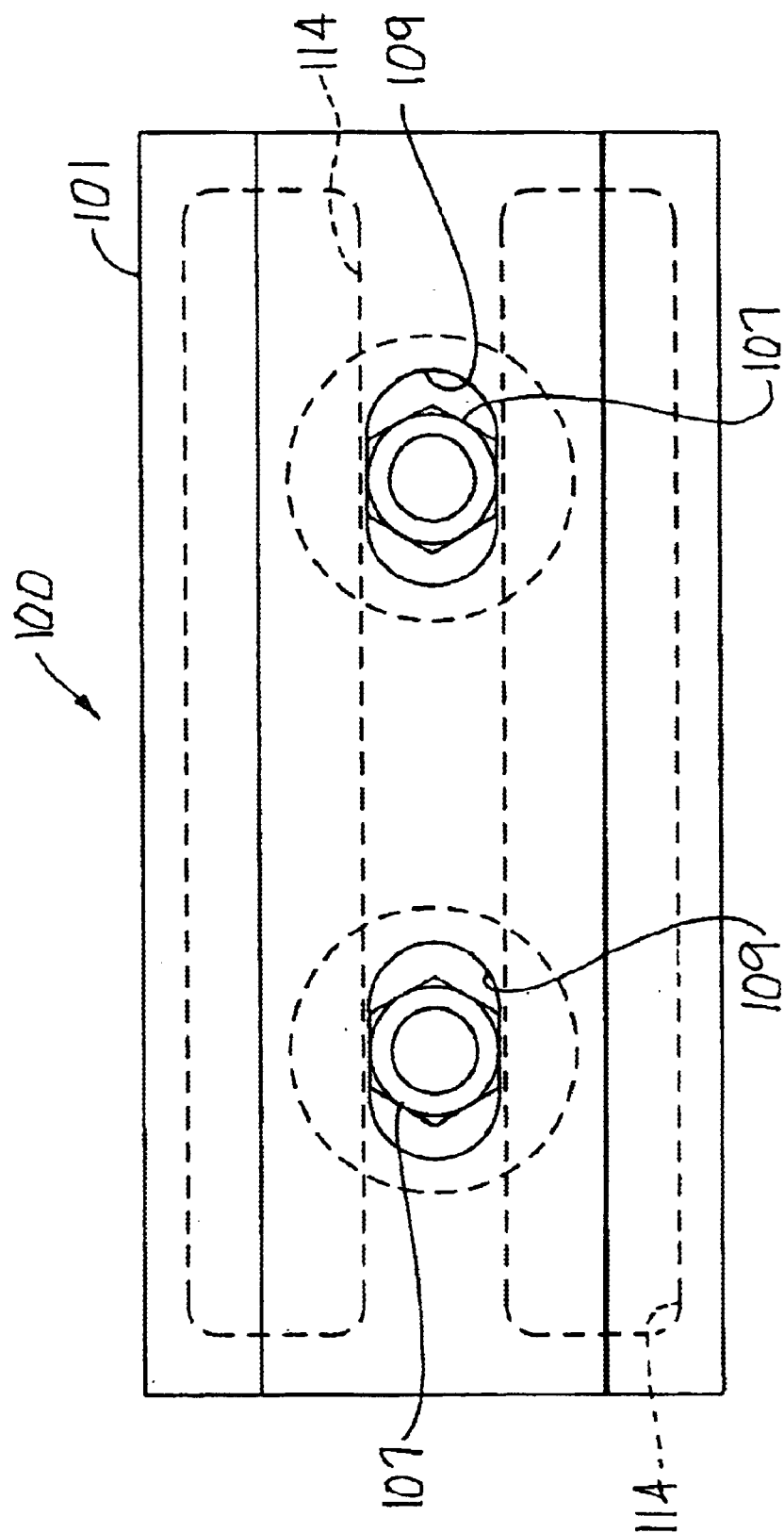

ADJUSTABLE SHOCK ABSORBING TOW BAR

BACKGROUND OF THE INVENTION

This invention relates to improvements in tow bars for product conveyor systems and, in particular, to a shock-absorbing tow bar that utilizes a bidirectional friction brake to couple a load-supporting carrier to a powered component of the movable conveyor.

As a product travels through a conveyor path, there are stations at which the product and carrier must halt and later resume travel. Stopping a load travelling at full conveyor speed, or restarting a load by engaging the carrier with a power source operating at full conveyor speed, can cause significant impact forces or shocks to be transmitted to both the conveyor apparatus and the product itself. These impacts can cause excessive noise in the work environment and damage to the conveyor and product. The load may shift or become dislodged causing an unsafe work environment. Shocks to the conveyor and product can cause attachment devices to fail and increase faults such as stress fractures in the product.

Industrial conveyor systems, including those of the power and free type disclosed herein, typically utilize tow bars between the powered component of the moving conveyor and one or more trailing, load-supporting carriers. Referring particularly to power and free conveyor systems, the powered component is the accumulating trolley on the free track and, when driven, is engaged by a pusher dog projecting from the conveyor chain on the power track. The accumulating trolley is the lead trolley and is connected to a trailing load trolley (or trollies) with a tow bar. Due to the rigidity of the trolley train and carrier assembly, the impact of a pusher dog engaging the accumulating trolley, or the impact of the accumulating trolley striking a stop, is imparted directly to the carrier under tow and may cause the load to shift, damage to the product, or excessive fatigue and wear on the components of the conveyor system.

To alleviate this excessive shock loading, a shock-absorbing link between the driven and towed components of industrial conveyor systems is highly desirable in order to provide a means of controlling the rapid acceleration and deceleration inherent in normal operation of the systems. One such device is an air-type shock absorber utilizing a piston that operates in a pneumatic chamber, an orifice through the piston permitting movement thereof only at a controlled rate. Also, similar devices have been employed of the hydraulic type and have the advantage of improved control due to the incompressibility of hydraulic fluid. An example of the air-type shock absorber is shown and described in U.S. Pat. No. 3,720,172 to Clarence A. Dehne, issued Mar. 13, 1973.

Furthermore, as the hydraulic-type shock absorber is subject to eventual leakage problems which render it totally inoperable and can cause contamination of the plant area occupied by the conveyor, a shock absorber utilizing metallic balls has been employed in an attempt to avoid the disadvantages of air and hydraulic-type shock absorbers. Such a metallic ball device is disclosed in U.S. Pat. No. 5,027,715 to Archie S. Moore et al, issued Jul. 2, 1991 where particulate damping material such as a quantity of ball bearings is positioned in a damping chamber. Acceleration and deceleration cause the bearings to be drawn past a piston through an annular space between the piston and the surrounding wall of the damping chamber. As the bearings become crowded on one side of the piston or the other, the resistance to movement increases. A disadvantage, however, is that over a period of time the piston abrades the surfaces of the balls and can cause them to fracture, thus their ability to roll lessens and the shock absorbing ability is degraded.

More recently, a shock absorbing tow bar has been developed and utilized in power and free conveyors and is disclosed in U.S. Pat. No. 5,511,486 to Pollard et al, issued Apr. 30, 1996, owned by the assignee hereof. A dampener tube is employed in which an oversized plunger moves against the resistance of a sleeve of resilient material thereby causing compression and displacement of the material as the plunger head shifts in response to rapid acceleration or deceleration of the conveyor. Although successful, the useful life of the tow bar can be a limitation along with its inability to withstand harsh operating conditions such as elevated heat and exposure to paint and paint solvents.

SUMMARY OF THE INVENTION

It is, therefore, the primary object of the present invention to provide a tow bar for a product conveyor which controls acceleration and deceleration and absorbs the shock that would otherwise be applied to the conveyor and the product, but accomplishes these results without the use of compressed air, hydraulic fluid, resilient materials or parts requiring close machining tolerances.

As a corollary to the foregoing object, it is an important aim of this invention to provide a tow bar for a conveyor in which relatively movable friction elements in a sandwich configuration respond to rapid acceleration and deceleration and absorb the shock by sliding engagement at internal wear surfaces.

Another important object is provide a tow bar as aforesaid in which the two friction elements comprise a rigid tongue slidably sandwiched between opposing wear surfaces.

Another important object is to provide a tow bar as aforesaid wherein pressure exerted by the wear surfaces on the tongue is adjustable to increase or decrease resistance to said relative movement.

Another important object is to provide a tow bar that can operate in a dynamic environment where it is repetitively subjected to high axial forces in response to acceleration and deceleration of associated conveyor components.

Another important object is to provide a tow bar for conveyors having an extended life and which can operate in a dynamic environment to dampen or absorb repetitive impacts.

Another important object is to provide a tow bar for conveyors that can provide shock absorption through multiple consecutive compressing impacts or multiple consecutive extending impacts.

Still another important objective is to provide such a tow bar that is able to withstand harsh operating conditions such as elevated heat and exposure to paint and paint solvents.

Another important object of the invention is to provide a tow bar construction of this type having an outer, protective sleeve which shields the friction elements from contaminants and enhances the structural integrity of the tow bar assembly.

Yet another important object of the invention is to provide a tow bar for conveyors of sufficient durability to undergo repetitive compression and extension hundreds of thousands of times during the life of the tow bar, and which is fail-safe in the event of a failure in response to an extending shock.

Other objects and advantages of this invention will become apparent from the following description taken in connection with the accompanying drawings, wherein is set forth by way of illustration and example, a now preferred embodiment of this invention.

DESCRIPTION OF THE DRAWINGS

FIG. 4 is a view of the dampener shaft and tongue assembly of the tow bar of FIG. 3 separated from the brake assembly to reveal details of construction.

FIG. 5 is a view of the brake assembly of the tow bar of FIG. 3 separated from the dampener shaft and tongue assembly to reveal details of construction.

FIG. 6 is a fragmentary exploded side view of the dampener shaft/tongue assembly and the brake assembly.

FIG. 7 is an enlarged plan view of the dampener shaft and brake tongue.

FIG. 8 is a side elevational view of the dampener shaft and brake tongue on the same scale as FIG. 7.

FIG. 9 is a cross-sectional view, as in FIG. 3, but with the tow bar in a partially compressed condition.

FIG. 10 is a cross-sectional view, as in FIGS. 3 and 9, with the tow bar in a fully compressed condition.

FIG. 23 is an enlarged, plan view of the brake assembly alone.

DETAILED DESCRIPTION

Figure 1:
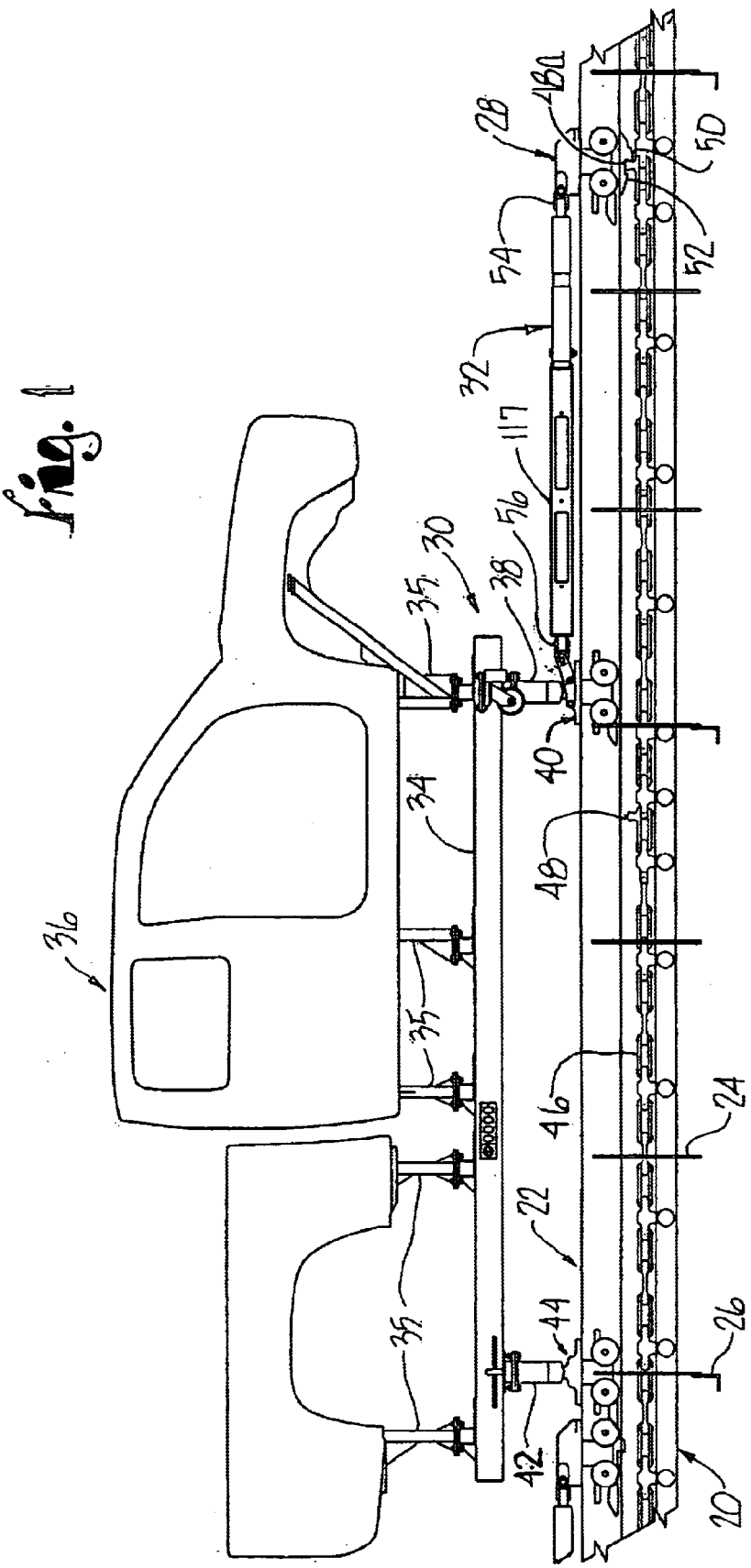
FIG. 1 is a fragmentary, side elevational view of an inverted power and free conveyor system showing a carrier joined to a powered trolley by the tow bar of the present invention.

FIG. 1 illustrates a portion of an inverted power and free conveyor system having the usual power track 20 disposed below and extending in parallelism with the free track 22. The tracks are rigidly interconnected by longitudinally spaced yoke plates 24 secured to a floor or other horizontal surface at spaced locations 26 along the span of the system. Typically, each of the tracks 20 and 22 is formed by a pair of spaced, opposed channel members within which the trolley rollers ride.

The trolley train shown in FIG. 1 has a leading (accumulating) trolley 28 to which a carrier 30 is connected by a tow bar 32. The carrier 30 includes a platform 34 which bears a product under assembly on a production line, such as an automotive vehicle illustrated at 36. The platform 34 is supported by a front pedestal 38 borne by an intermediate load trolley 40, and a rear pedestal 42 carried by a trailing load trolley 44. During movement, the leading trolley 28 is powered by a conveyor chain 46 on spaced power trollies which ride in the power track 20. As is conventional, the conveyor chain 46 is provided with spaced, upwardly projecting pusher dogs 48, each engageable with a driving dog 50 depending from the lead trolley 28 of each train and spaced forwardly from a holdback dog 52. One of the pusher dogs is designated 48a for clarity and is shown in engagement with the driving dog 50 of trolley 28 of the train illustrated in FIG. 1. The front and rear ends of the tow bar 32 are connected to the leading trolley 28 and the intermediate trolley 40 by clevis and pin connections 54 and 56.

Figure 2:
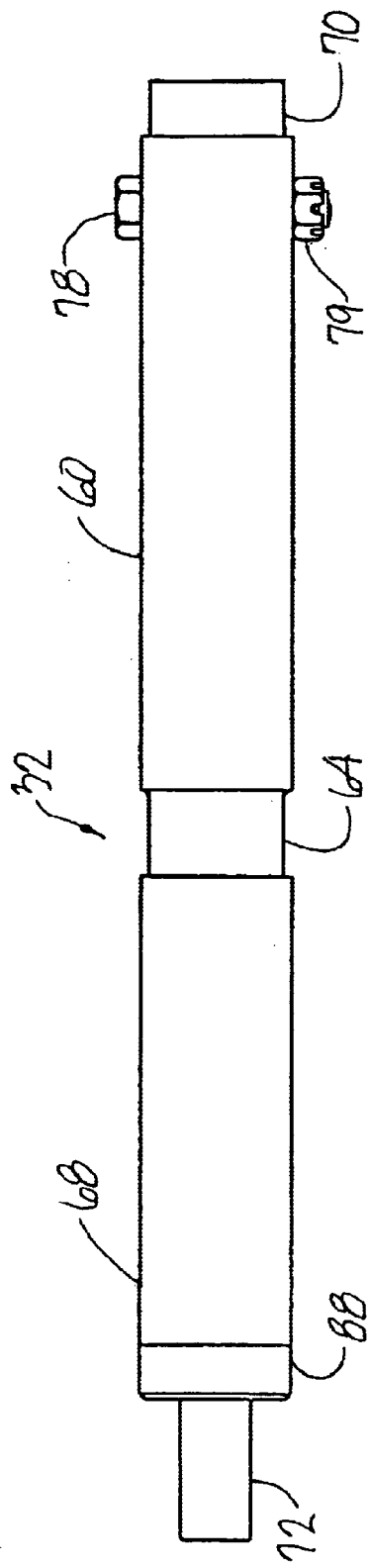
FIG. 2 is an enlarged, elevational view of the tow bar alone.
Figure 3:
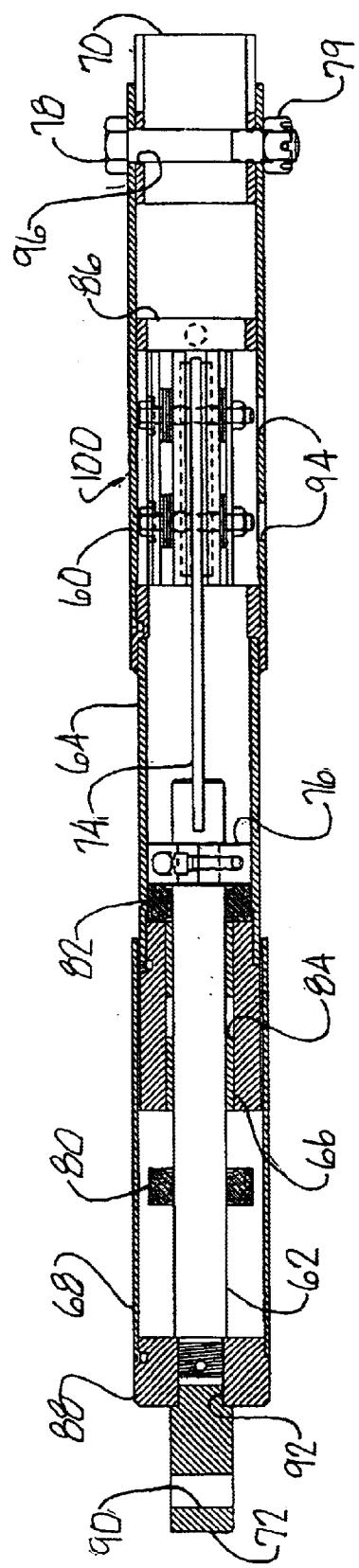
FIG. 3 is a longitudinal cross-sectional view of the tow bar of FIG. 2, but in an extended condition, some parts being shown in elevation for clarity.
Figure 15:
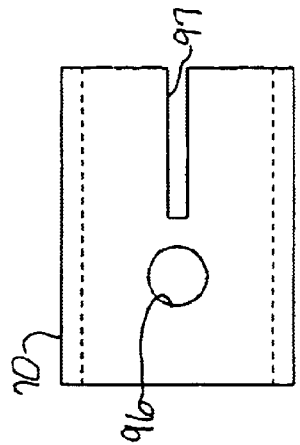
FIG. 15 is a plan view of the end connection adapter showing the hole used for securing the adapter to the dampener sleeve and the slot provided to accept the extension bar.
Figure 14:
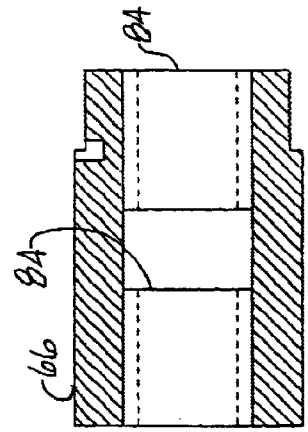
FIG. 14 is a detail in longitudinal cross section of the shaft bearing support.
Figure 11:
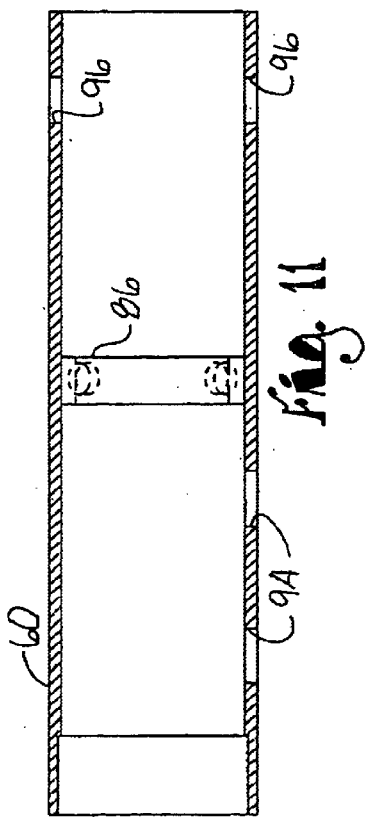
FIG. 11 is a detail in longitudinal cross section of the dampener sleeve.
Figure 12:
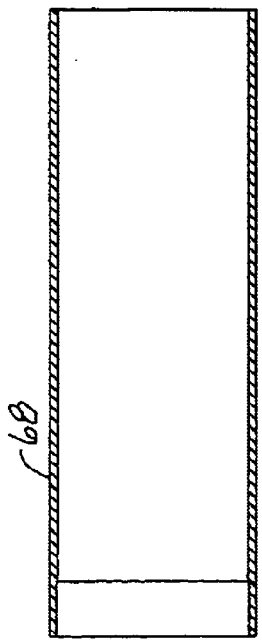
FIG. 12 is a detail in longitudinal cross section of the front shaft cover.
Figure 13:
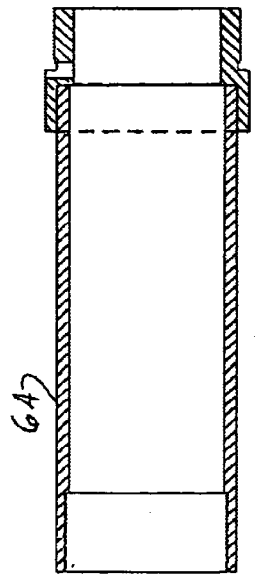
FIG. 13 is a detail in longitudinal cross section of the shaft cover.

An enlarged, side elevational view of the tow bar of the present invention is shown in FIG. 2. The tow bar 32 of FIG. 2 is shown in cross-sectional detail in FIG. 3. Major components of the tow bar 32 are shown in FIGS. 3–5 and comprise a dampener sleeve 60 within which a brake assembly 100 is secured, a front shaft cover 68 coaxial with and attached to a dampener shaft 62, a brake tongue 74 affixed to and extending axially from the shaft 62, and a shaft cover 64 providing a tubular link extending coaxially from the inner end of sleeve 60. The dampener sleeve 60 and shaft cover 64, and front shaft cover 68 are formed from elongated tubular members that cooperate to present a two-piece, telescoping tubular housing for the tow bar 32. An end connection adapter 70 projecting from the outer end of dampener sleeve 60 (as viewed in FIGS. 2 and 3) presents the rear end of tow bar 32 that is connected to the intermediate trolley 40 at connection 56 (FIG. 1). Similarly, a lug 72 projecting from the outer end of the front shaft cover 68 presents the front end of the tow bar 32 that is attached to the leading trolley 28 at connection 54 (FIG. 1).

Referring to FIGS. 3–8, it may be appreciated that the tongue 74 is a flat, substantially rectangular plate having an elongated central slot 75 (FIG. 7) disposed along a substantial portion of the longitudinal center thereof. The tongue 74 is welded or otherwise attached to the dampener shaft 62, which secures the tongue 74 to a shaft seat 88. As is particularly clear in FIG. 6, a number of parts fit over the dampener shaft 62 including a two-piece metal shaft collar 76 secured within circumferential recess 77 (FIG. 6), an annular rear compression ring 82 preferably composed of Viton and which provides a safety impact absorbing bumper at maximum travel (FIG. 3), a cylindrical shaft bearing support 66 having a rearward threaded end, and a forward compression ring 80 serving the same function as ring 82 but at the opposite end of travel (FIG. 10). The forward, threaded end of the dampener shaft 62 screws into a threaded, axial bore in the shaft seat 88. The shaft seat 88 also has a circumferential threaded male portion that screws into a threaded female portion of the forward end of the front shaft cover 68.

Figure 19:
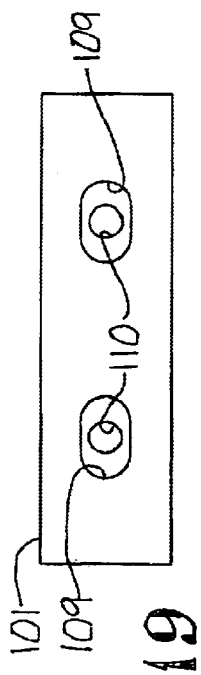
FIG. 19 is a plan view of the top plate of the brake assembly.
Figure 20:
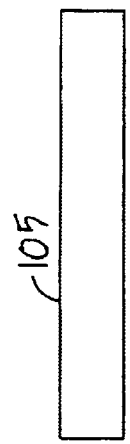
FIG. 20 is a plan view of a brake pad.
Figure 22:
FIG. 22 is a plan view of the bottom plate of the brake assembly.
Figure 16:
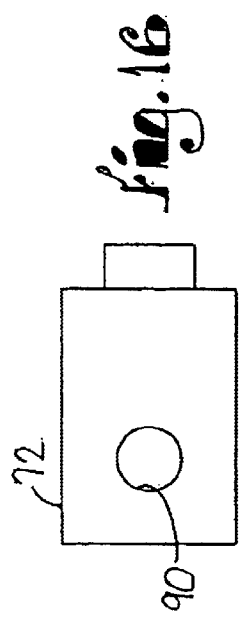
FIG. 16 is a plan view of the front end lug.
Figure 17:
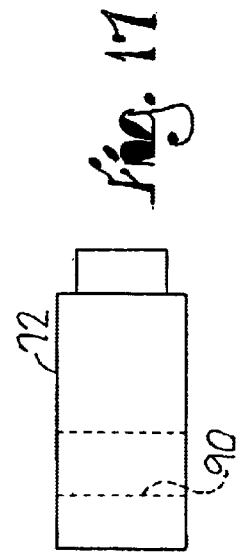
FIG. 17 is a side elevational view of the front end lug.
Figure 18:
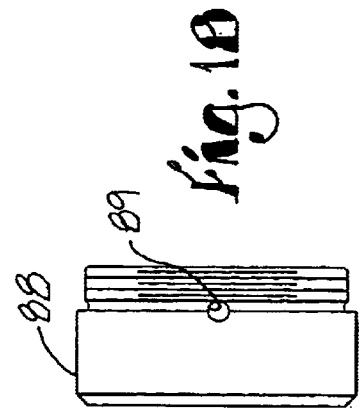
FIG. 18 is a side elevational view of the shaft seat showing the counter sunk screw hole used to fix the shaft seat and front shaft cover in position.
Figure 24:
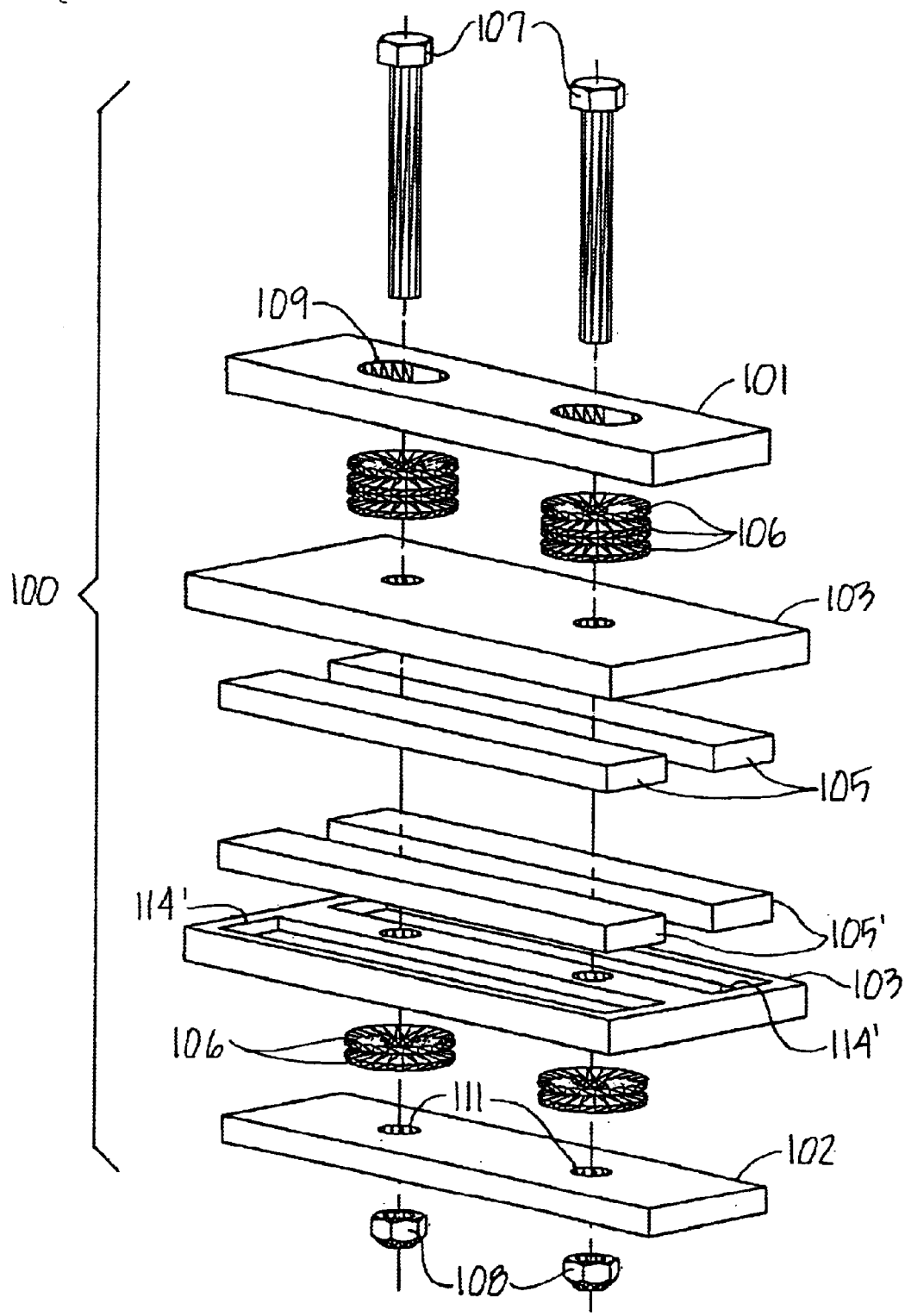
FIG. 24 is an enlarged, exploded, perspective view of the brake assembly.

The tongue 74 is received between spaced friction elements presented by brake pads 105 of the brake assembly 100. FIGS. 6 and 24 show exploded views of the brake assembly 100 and tongue 74 to clarify the relative location of individual parts. The brake assembly 100 is comprised of a flat rectangular top plate 101 having a top surface and a bottom surface (FIGS. 6 and 19). Two spaced-apart holes 110 are provided in the top plate 101 that penetrate the top surface through to the bottom surface. Surrounding each hole 110 is a larger recess 109 in the top surface that does not penetrate the bottom surface. The holes 110 are provided to allow passage of bolts 107, the heads of the bolts 107 being set into the respective recesses 109 (FIG. 23). The brake assembly also comprises a flat rectangular bottom plate 102 having holes 111 therein positioned to align with the holes 110 in the top plate 101 (FIG. 22).

Figure 21:
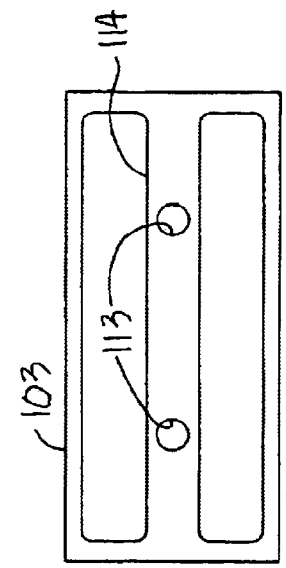
FIG. 21 is a plan view of a brake shoe.

Spring washers 106, brake shoes 103 and brake pads 105 are positioned between the top 101 and bottom 102 plates to provide wear surfaces at the opposed faces of pads 105 that can be tightened against the slidable tongue 74 (FIG. 24). A first set of spring washers 106 are positioned underneath the top plate 101 to provide compression between the top plate 101 and a brake shoe 103 beneath the washers 106. The brake shoe 103 is a rectangular, relatively flat block with two holes 113 aligned with the holes 110, 111 in the top 101 and bottom 102 plates (see FIGS. 19–22 and 24). In the preferred embodiment, the brake shoe 103 has two elongated recesses 114 located on either side of the holes 113 as shown in FIGS. 21 and 23. The brake shoe 103 is positioned with the recesses 114 facing downward (FIG. 23). Brake pads 105 thus project downwardly from the brake shoe 103 and are received by and held within the recesses 114. This structure forms the top part of the brake assembly 100 that contacts the top surface of the positioned tongue 74.

Below the tongue 74 is a second set of brake pads 105' held within a second brake shoe 103' (see FIGS. 6 and 24). This second brake shoe 103' is typically identical to the first, upper brake shoe 103, however, it is oriented with the recesses 114' facing upward to hold the lower, second set of brake pads 105'. A set of spring washers 106 is positioned below the second brake shoe 103' to separate it from the bottom plate 102, which is positioned below these washers. The bottom plate 102 differs from the top plate 101 in that it is not provided with recessed areas surrounding the holes 111. Locknuts 108 are threaded onto bolts 107, which are inserted into the top plate 101 and pass through the entire brake assembly 100. By tightening the locknuts 108, the top and bottom portions of the brake assembly 100 are squeezed against the positioned tongue 74.

The components of the brake assembly 100 are typically composed of a rigid, durable material such as steel or other metal. In the preferred embodiment the brake pads are rectangular blocks, approximately 5 inches long, ¾ inches wide, and ¼ inch thick. The brake pads may be composed of materials similar to those for automobile brake pads and may include constituents such as carbon fiber, fiberglass, and polytetrafluoroethylene or other heat and chemical resistant plastics. Preferably, the material selected to form the brake pads should be capable of withstanding temperatures in excess of 450° F. as may be experienced along a conveyor line in an automobile assembly plant. The currently preferred material is glass-filled polytetrafluoroethylene.

FIGS. 3, 6, 9 and 10 show the tongue 74 received within the longitudinal passage presented by the brake assembly 100 between the brake pads 105 and 105'. The tongue 74 and brake assembly 100 are movable relative to each other longitudinally (axially) of tubular housing members 60, 64 and 68, such movement occurring in response to rapid acceleration or deceleration of the conveyor as will be discussed in detail below. The tongue 74 in FIG. 3 is shown at nearly the limit of its movement relative to brake assembly 100 when the tow bar 32 is in an extended position. FIGS. 9 and 10 show the tow bar 32 in partially compressed and fully compressed positions, respectively.

Assembly of the tow bar 32 may be appreciated from viewing FIGS. 3 to 6 collectively. Turning first to FIG. 6, the top and bottom portions of the shaft collar 76 are fitted over the dampener shaft 62 and tightened together using bolts on either side. The Viton compression ring 82 slides on the dampener shaft 62 and is positioned against the shaft collar 76. The shaft bearing support 66 is also positioned on the dampener shaft 62, threads facing rearward. The shaft cover 64 is then threaded onto the shaft bearing support 66. A set screw is installed in a tapped hole at the joint between the shaft cover and the shaft bearing support to fix the two pieces in place relative to each other (i.e. to prevent the threaded union from loosening). The second Viton ring 80 is then positioned on the dampener shaft 62 forward of the shaft bearing support 66. The front shaft cover 68 is placed over the shaft bearing support 66 with the internal threads of the cover oriented forward. The shaft seat 88 is threaded onto the dampener shaft 62 via the central shaft seat hole 92. The front shaft cover 68 is then threaded onto the shaft seat 88. A set screw is installed to fix the cover 68 and seat 88 in position and prevent loosening of the attachment.

Turning to the brake assembly 100, the brake pads 105 are installed in the recesses 114 provided in the brake shoes 103. Pads 105 are typically held in place by pressure fit without need for adhesive. Hex head bolts 107 are then placed through holes 110 in top plate 101 and three washer springs 106 are placed over the end of each bolt 107. The brake shoe 103, with installed pads 105 facing downward, is placed over the bolt ends and the resulting upper brake assembly is fitted over the tongue 74 by placing the bolt ends 107 through the brake tongue slot 75. The second brake shoe 103' (installed pads facing upward) is placed through the bolts 107 below the tongue 74, washer springs 106 are installed, and the bottom plate 102 is placed over the bolts 107. A lock nut 108 is threaded onto the end of each bolt 107 to secure the brake assembly 100. The nuts 108 are tightened sufficiently to hold tongue 74 between pads 105 and the bolt heads are checked to make sure that they are within the top plate recesses 109.

The end connection adapter 70 is placed into the rearward end of the dampener sleeve 60 and and secured with a bolt 78 and locknut 79. The dampener sleeve 60 is then threaded onto the shaft cover 64 and tightened. At this point it is important to assure that the adjustment holes 94 in the dampener sleeve 60 are positioned in line with the locknuts 108 on the brake assembly 100 so that the nuts 108 may be externally accessed for adjustment. When said positioning is attained, a hole is drilled and tapped through the dampener sleeve 60 into the shaft cover 64 and a set screw installed therein to secure the threaded joint from loosening and to maintain positioning of the adjustment holes 94.

Opposite the end connection adapter 70, the end lug 72 is threaded into the shaft seat hole 92 at the outside end of the shaft seat 88. It is important that the connection hole 90 in the lug 72 is positioned parallel to the adjustment holes 94 in the dampener sleeve 60 so that adjustment holes 94 can be positioned facing downward upon installation of the tow bar 32 on a conveyor. The lug 72 is preferably secured in position by welding a fillet around the juncture with the shaft seat 88.

Figure 25:
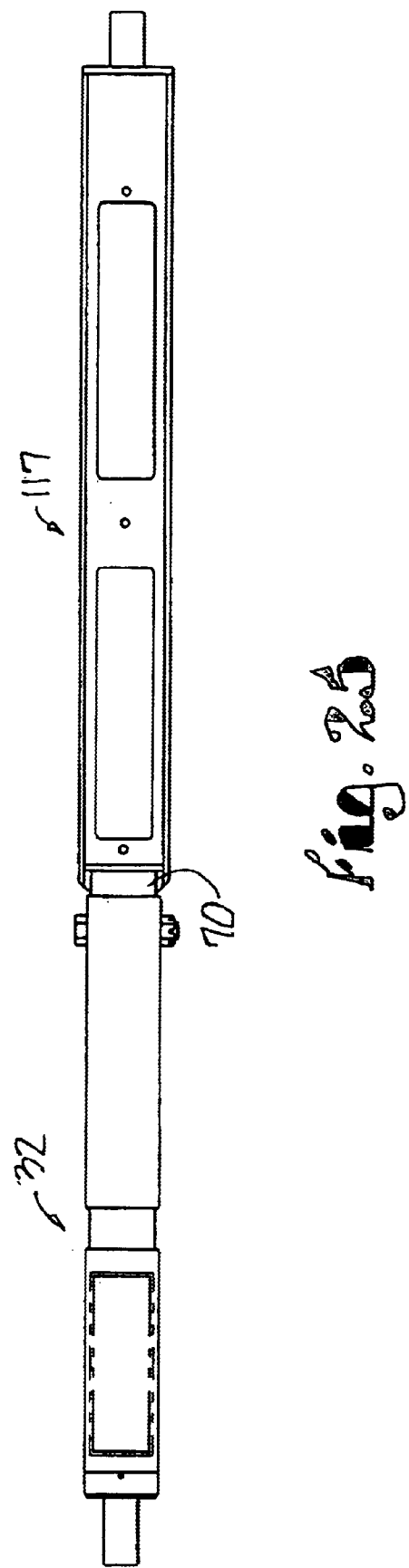
FIG. 25 is a side elevational view showing the tow bar of the present invention joined to the extension bar.

Extension of the tow bar 32 to the necessary length to reach from the leading trolley 28 to the intermediate trolley 40 in FIG. 1 is accomplished by welding an extension bar 147 onto the end connection adapter 70. See FIG. 25. The extension bar 117 may be cut, or otherwise formed, to any length that is appropriate.

Due to the adjustable design of this shock absorbing tow bar 32, resistance may be selected such that the tow bar 32 can absorb multiple consecutive shocks or impacts in the same direction. Preferably, the device is set so that the tongue 74 slides approximately one inch upon each impact. A device with a five-inch slot 75 in the tongue 74 could thereby absorb five compressing impacts from a fully extended starting position, or five extending shocks from a fully compressed position. In use, a compressing impact such as caused by collision with another trolley is typically followed by an extending shock delivered when the lead trolley is reengaged by a conveyor pusher dog. In the unlikely event of a total failure of the brake in response to an extending shock, collar 76 abuts compression ring 82 (held by bearing 66) to preclude separation (FIG. 3) and provide a fail-safe design.

In summary, relative movement of the tongue 74 within the brake pad assembly 100 requires that the resistance or friction caused by contact between the pads 105, 105' and tongue 74 be overcome, and thus energy is absorbed in the course of moving the tongue 74 from an initial to a final, rest position. This absorption of the energy of impact isolates the carrier 30 in FIG. 1 from sudden, high forces that would otherwise be applied to the carrier by rapid acceleration or deceleration.

Having thus described the invention, what is claimed as new and desired to be secured by Letters Patent is:

1. In combination with a leading component and a trailing, load-supporting component of a product conveyor, a shock-absorbing tow bar for minimizing the effect of rapid acceleration or deceleration of the conveyor, said tow bar comprising:
    a pair of elongated tubular housing members in longitudinally aligned relationship and presenting a forward end and a rearward end,
    means for connecting said forward end to said leading component of the conveyor, and for connecting said trailing end to said load-supporting component of the conveyor,
    an elongated brake tongue,
    means for securing said tongue within one of said tubular housing members, said tongue extending longitudinally thereof,
    a brake assembly secured within said other housing member and including at least a pair of spaced friction elements slidably receiving said tongue to present a sandwich configuration,
    said friction elements presenting opposed wear surfaces in contact with said tongue, and
    pressure means engaging said elements for selectively maintaining said wear surfaces against said tongue to cause a predetermined frictional resistance therebetween,
    said tubular housing members being longitudinally movable relative to each other to cause corresponding relative movement of said tongue within said brake assembly,
    whereby collision of said leading component with an object such as another conveyor, or engagement of said leading component by a powered driving component causes tongue to slide longitudinally relative to said friction elements to absorb shock transmitted by the collision or engagement.

2. The combination as claimed in claim 1, wherein said tubular housing members are disposed in relatively telescoped relationship.

3. The combination as claimed in claim 1, further comprising means preventing separation of said tubular housing members upon longitudinal movement to an extended position caused by failure of said brake assembly in response to an extending shock.

4. The combination as claimed in claim 1, wherein said brake assembly includes spaced brake shoes having inwardly facing sides provided with said friction elements.

5. The combination as claimed in claim 1, wherein each of said friction elements is composed of a fiber-reinforced, heat and chemical resistant plastic.

6. The combination as claimed in claim 1, wherein each of said friction elements is composed of a glass-filled polytetrafluoroethylene.

7. The combination as claimed in claim 1, wherein each of said friction elements is composed of a carbon-filled polytetrafluoroethylene.

8. The combination as claimed in claim 1, wherein each of said friction elements comprises one or materials selected from the group consisting of carbon fiber, polytetrafluoroethylene, and fiberglass.

9. In combination with a leading component and a trailing, load-supporting component of a product conveyor, a shock-absorbing tow bar responsive to acceleration or deceleration of the conveyor, said tow bar comprising:
    an elongated tubular brake housing member having an open end,
    a friction brake assembly in said housing member secured thereto, and including a pair of spaced brake shoes and brake pads mounted on inwardly facing sides of said brake shoes,
    an elongated tubular shaft housing member having an open end,
    an elongated brake shaft within and secured to said shaft housing member, extending longitudinally thereof and presenting a free end projecting from said open end of the shaft housing member,
    a brake tongue slidably positioned between said brake pads in frictional contact therewith, said tongue being attached to said free end of the brake shaft,
    means for slidably interengaging the open ends of said housing members to maintain the same in relatively telescoped relationship for movement relative to each other along a longitudinal axis,
    means for selectively applying force to said brake shoes to cause a predetermined frictional resistance between said brake tongue and said brake pads,
    said relatively telescoped brake and shaft housing members presenting forward and trailing ends, and
    means for connecting said forward end to one of said components of the conveyor, and for connecting said trailing end to the other of said components of the conveyor,
    whereby impact communicated to said tow bar shifts the housing members along said longitudinal axis to lengthen or shorten the tow bar in response to acceleration or deceleration, respectively of the conveyor, and causes corresponding movement of the brake tongue against the resistance of the brake pads to thereby absorb the shock of accelerating or decelerating impact.

10. The combination as claimed in claim 9, wherein each of said brake pads is composed of a fiber-reinforced, heat and chemical resistant plastic.

11. The combination as claimed in claim 9, wherein each of said brake pads is composed of a glass-filled polytetrafluoroethylene.

12. The combination as claimed in claim 9, wherein each of said brake pads is composed of a carbon-filled polytetrafluoroethylene.

13. The combination as claimed in claim 9 wherein each of said brake pads comprises one or materials selected from the group consisting of carbon fiber, polytetrafluoroethylene and fiberglass.

14. A method of minimizing the effects of acceleration or deceleration of a product conveyor comprising the steps of:

provifing a leading component and a trailing, load-supporting component of a product conveyor;

providing an elongated tubular brake housing member, providing, in said brake housing member, a friction brake assembly having a pair of spaced brake shoes with brake pads mounted on inwardly facing sides of said brake shoes, slidably positioning a brake tongue between said brake shoes in contact with said brake pads, attaching said tongue to a dampener shaft within an elongated shaft housing member, relatively telescoping said brake housing member and said shaft housing member such that one of said housing members may slide longitudinally within the other to allow said tongue and brake assembly to concurrently move relative to each other, selectively applying force to said brake shoes to cause frictional resistance between said tongue and said brake pads, and connecting said housing members between said leading and trailing components to thereby provide a tow bar in which relative longitudinal movement of the members and lengthening or shortening of the tow bar occurs in response to acceleration or deceleration of the conveyor, thereby absorbing the shock thereof.

\* \* \* \* \*

UNITED STATES PATENT AND TRADEMARK OFFICE
CERTIFICATE OF CORRECTION

PATENT NO. : 6,679,185 B2
DATED : January 20, 2004
INVENTOR(S) : Michael Dennis Sullivan et al.

It is certified that error appears in the above-identified patent and that said Letters Patent is hereby corrected as shown below:

<u>Column 8,</u>
lines 39-42 and insert the following paragraph:
-- an elongated brake shaft within and secured to said shaft housing member, extending longitudinally thereof and presenting a free end projecting from said open end of the shaft housing member, --

Signed and Sealed this

Eighteenth Day of May, 2004

JON W. DUDAS
*Acting Director of the United States Patent and Trademark Office*